US006158295A

United States Patent [19]

Nielsen

[11] Patent Number: 6,158,295
[45] Date of Patent: Dec. 12, 2000

[54] LINEAR ACTUATOR

[75] Inventor: Jens Jørgen Nielsen, Broager, Denmark

[73] Assignee: Linak A/S, Nordborg, Denmark

[21] Appl. No.: 09/331,242

[22] PCT Filed: Dec. 23, 1997

[86] PCT No.: PCT/DK97/00597

§ 371 Date: Jun. 17, 1999

§ 102(e) Date: Jun. 17, 1999

[87] PCT Pub. No.: WO98/30816

PCT Pub. Date: Jul. 16, 1998

[30] Foreign Application Priority Data

Dec. 23, 1996 [DK] Denmark ................................ 1510/96

[51] Int. Cl.[7] ................................................. F16H 25/24

[52] U.S. Cl. ....................... 74/89.15; 475/317; 192/223.4

[58] Field of Search .................................. 74/89.15, 128; 475/317; 192/223.4, 12 BA, 56.2, 150

[56] References Cited

U.S. PATENT DOCUMENTS

| | | | |
|---|---|---|---|
| 2,881,881 | 4/1959 | Sacchini et al. | 192/223.4 |
| 3,097,546 | 7/1963 | Kelbel et al. | 475/317 |
| 3,693,759 | 9/1972 | Schindel | 185/40 R |
| 3,930,566 | 1/1976 | Matsushima | 192/223.4 |
| 3,979,975 | 9/1976 | Schulman | 192/12 BA |
| 4,246,991 | 1/1981 | Oldakowski . | |
| 4,328,871 | 5/1982 | Gluskin | 192/54.1 X |
| 4,527,683 | 7/1985 | Mathews | 192/111 A |
| 4,603,594 | 8/1986 | Grimm . | |
| 4,987,788 | 1/1991 | Bausch | 74/89.15 |
| 5,193,408 | 3/1993 | Fukui et al. | 74/89.15 |
| 5,681,005 | 10/1997 | Ligon, Sr. et al. | 192/223.4 X |

FOREIGN PATENT DOCUMENTS

| | | |
|---|---|---|
| 0577541 | 1/1994 | European Pat. Off. . |
| 0662573 | 7/1995 | European Pat. Off. . |

*Primary Examiner*—Rodney H. Bonck
*Assistant Examiner*—Ha Ho
*Attorney, Agent, or Firm*—Dykema Gossett PLLC

[57] ABSTRACT

A linear actuator includes a housing, a spindle rotatable in both directions, a threaded nut driving a piston rod, and a motor capable of driving the spindle through a transmission, a disengagement unit being arranged in the transmission for interrupting the connection between the motor and the spindle in case of operational failure, such as overloading of the spindle, the disengagement unit comprising brake means adjustable with respect to the actuator housing to cooperate with coupling means for control of the rotational speed of the spindle when this is disengaged from the motor. The linear actuator provides an emergency function ensuring that the linear actuator and the carried load are not damaged by overloading of the actuator.

9 Claims, 2 Drawing Sheets

LINEAR ACTUATOR

BACKGROUND OF THE INVENTION

1. Field of the Invention

The present invention relates to a linear actuator including an actuator housing, a spindle rotatable in both directions, a threaded nut driving a piston rod, and a motor capable of driving the spindle through a transmission, a disengagement unit being arranged in the transmission to interrupt the connection between the motor and the spindle in case of operational failure, such as overloading of the spindle.

2. The Prior Art

Linear actuators are used for numerous tasks where a linear movement or application of a force is desired. Examples include electrically operated doors and hospital beds, where the linear actuator is arranged such that the piston rod performs the desired movement from one position to another as a result of control signals and optionally controlled by end stops.

In practice, it may be desirable to get from one extreme position to the other at a great speed or from a given position to one of the end positions, or, altogether, to be able to set the moved element without being tied to the mechanism of the linear actuator. In case of doors, e.g., it may be needed that the release of security means by an excessive temperature allows rapid closing as a fire door, or that a normally closed door must be capable of being used as an emergency exit even if the power supply should fail. In a hospital bed, it may be desirable rapidly to obtain a completely horizontal posture even though the head part of the bed is raised.

For this purpose, EP-A-0 685 662 discloses a linear actuator of the type mentioned where the connection between the spindle and the electric motor may be interrupted in an emergency. If the piston rod of the actuator is loaded, it will almost instantaneously be pushed (or pulled) back to the starting position.

The actuator of EP-A-0 685 662 includes means for disengaging spindle from motor. These consist of a disengagement unit between the spindle and a transmission shaft based on axially oriented coupling parts, which are connected with the spindle and the transmission shaft, respectively, and which are surrounded by a helical coupling spring capable of being expanded radially for disengaging the spindle from the motor.

In normal operation, the disengagement means are driven from the transmission. This drive is transferred through the coupling parts and further on to the spindle. If, on the other hand, the disengagement means are affected by a drive pulse from the spindle side, the spindle is disengaged from the motor transmission so that the spindle can rotate freely, which causes the piston rod to be pushed back to the starting position.

In many situations, however, this solution involves the risk of causing damage to the structure and the load carried by the actuator because of the impact applied to the structure and the load when the piston rod hits the end stop in the starting position.

The object of the invention is to provide a linear actuator which ensures that the structure and the load carried by the actuator are not damaged. It is moreover intended in this connection that the size and the cost price of the actuator are not increased noticeably, just as a solution must not reduce the efficiency of the actuator or increase the consumption of energy.

SUMMARY OF THE INVENTION

The invention includes a linear actuator of the noted in which the disengagement unit contains brake means rotationally adjustable with respect to the actuator housing to cooperate with coupling means for control of the rotational speed of the spindle when this is disengaged from the motor.

This ensures an emergency function of a linear actuator which is deactivated in normal operation, and which is automatically activated by the disengagement of the spindle from the motor in such a manner that the return speed of the piston rod back to the starting position is adjustable.

With the invention, an emergency function may thus be applied to a linear actuator without the efficiency and the power consumption of the actuator being affected hereby, just as a linear actuator according to the invention may be constructed with the same size as before and at approximately the same cost price.

In the preferred embodiment, the coupling parts in the coupling means are provided with axially protruding claws to establish a finger coupling between the parts. This ensures effective and anti-skid transfer of torque from the motor transmission to the spindle. Furthermore, when the individual claws are formed with radially oriented side faces, large engagements faces between the claws in the two coupling parts are provided, thereby increasing the torques which can be transferred.

In a preferred embodiment, the brake means in the disengagement unit include a pipe section which, via adjustments means, is in adjustable frictional contact with the housing of the actuator. The pipe section is rotatably arranged in the actuator housing and surrounds the coupling means in such a manner that a coupling is established between the coupling means and the pipe section by means of the coupling spring, the coupling spring being expanded radially upon disengagement.

The transmission driving the spindle is constructed as a planet gear including a sun wheel driven by the motor, one or more planet wheels connected with one of the coupling parts in the coupling means, and a ring wheel fixedly connected with the brake means, preferably constructed as part of the inner side of the pipe section. When a planet gear is used for the transmission in a linear actuator, the advantages of this type of gearing with respect to efficiency are turned to account, while ensuring that the transmission and the disengagement unit may be constructed extremely compactly, and not least that a linear actuator according to the invention is hereby moment-free in the suspension eyes. Particularly that the actuator is moment-free in the suspension, in spite of the rotary movements of the electric motor, provides advantages not only in connection with the mounting, but also in connection with the start of the actuator, as no jerk may occur in the actuator upon start of the motor.

The invention will be described more fully below with reference to the accompanying drawings.

DETAILED DESCRIPTION OF THE PREFERRED EMBODIMENTS

Figure 1:
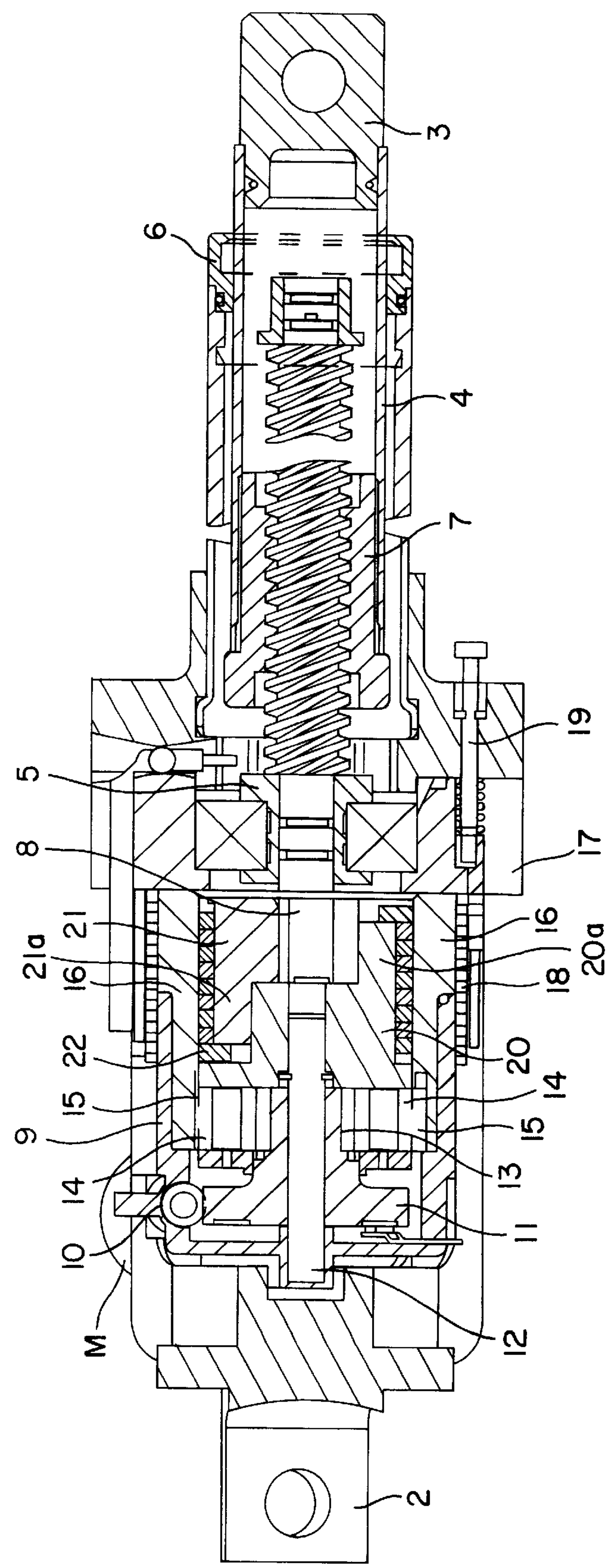
FIG. 1 is a sectional view through a linear actuator according to a preferred embodiment of the invention.

FIG. 1 shows a linear actuator having an actuator housing 9 in which a to admission and a coupling unit are arranged.

At one side the transmission is connected with an electric motor (not shown) which, via the transmission and the coupling unit, drives a non-self-locking spindle 8 which drives a threaded nut 7, whereby the piston rod 4 mounted on the threaded nut 7 is displaced linearly between two end stops 5, 6 and increases or decreases the distance between suspension eyes 2, 3.

The drive shaft of the electric M motor is provided with a worm 10 which drives a transmission wheel 11 which rotates about the shaft 12. This transmission wheel is provided with a toothed wheel 11 for engagement with the worm as well as a sun wheel 13 which drives a planet gear. The planet gear additionally includes a plurality of planet wheels 14 which are connected with a coupling part 20 in the coupling unit, and a ring wheel 15 provided in the inner side of a pipe section 16 which is rotatably arranged in the actuator housing 9. A brake spring 18 is wound around the pipe section and is secured to the actuator housing 9 and connected with a release device 17.

The planet wheels 14 are rotatably mounted on the end of the first coupling part 20 which can rotate freely about the shaft 12. This first coupling part 20 cooperates with a second coupling part 21, which engages the end of the spindle shaft 8, for transmission of the rotation of the planet wheels about the sun wheel 13 to the spindle shaft 8. Each of the two o coupling parts 20, 21 is provided with a set of axially protruding claws 20*a*, 21*a*, which are in loose engagement with each other, for establishing a finger coupling. In the engagement area between the coupling parts 20, 21, a coupling spring 22 is arranged on the outer sides between these parts 20, 21 and the pipe section 16. The ends of the spring 22 are bent inwards so as to be seated between the claws in the finger coupling, recesses being provided in the respective claws to receive the spring ends so that the claws, when they are in engagement, can engage over the entire longitudinal faces. The spring 22 is arranged in such a manner that it is screwed together around coupling parts 20, 21 when the coupling unit is driven from the motor side, so that the transmission is transferred from the planet wheels 14 to the first coupling part 20 and further on to the second coupling part 21 which transfers the rotation to the spindle shaft 8. If, on the other hand, the transmission is subjected to a transmission pulse from the spindle 8 because of a load, an oppositely directed rotational force is applied to the coupling spring 22, causing it to be expanded radially, whereby the coupling parts are disengaged from the motor drive, in that the spring 22, upon expansion, establishes a frictional engagement with the inner face of the pipe section 16. This means that the coupling parts 20, 21 and the rely the spindle 8 are caused to rotate together with the pipe section 16.

The spindle 2 is thus prevented from rotating as long as the pipe section 16, with which the coupling parts 20, 21 concentrically arranged therein are in frictional engagement, is braked with respect to the actuator housing 9. This means that, in a load situation, the piston rod 4 of the actuator is not pushed back, but remains in its position. When the tension of the brake spring 18 around the pipe section 16 is reduced by pulling the adjustment rod 17*a* (see FIG. 2) in the release device 17, the piston rod 4 can slide back to the starting position in a controlled manner, it being hereby possible to control the rotational speed of the pipe section 16 and thereby the spindle 8.

Figure 2:
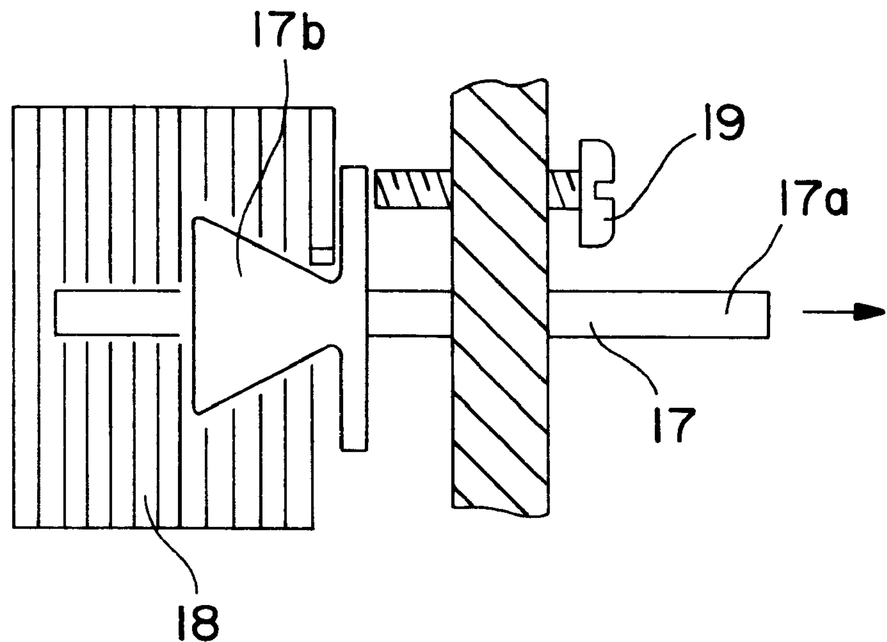
FIG. 2 is a view of a detail of the adjustment device in the linear actuator in FIG. 1.

The pipe section 16 is rotatably mounted in the actuator housing 9 so that the rotational speed can be controlled via a release device 17, see also FIG. 2. This release device 17 works in that the screw-shaped brake spring 18 is tensioned around the pipe section 16 so that the friction between the spring 18 and the pipe section 16 may be adjusted in a controlled manner by slackening the spring. The brake spring 18 is connected at one end with an adjustment rod 17*a*, which is mounted on the housing 9, via a cone or wedge element 17*b*, while the other end is secured directly in the housing 9. The tension of the brake spring 18 around the outer side of the pipe section 16 may hereby be adjusted, allowing the pipe section to rotate in a controlled manner from a secured position. As appears from FIG. 1, it is the outer part of the spring 18 that surrounds the pipe section 16. This provides the best effect of the release device 17 as it is just a small portion of the spring 18 which is to be "opened" to slacken its tension around the pipe section 16. The greatest permissible "opening" of the spring 18 may be adjusted by an adjustment screw 19 in the adjustment device 17. The maximum rotational speed of the spindle 8 may thus be adjusted with this adjustment screw 19 when it is disengaged from the motor.

The mode of operation of the actuator is as follows:

i) In a normal state of operation with power supply to the electric motor, the electric motor drives the sun wheel 13 in the planet gear via the worm 10 and the toothed wheel 11. As the ring 16 is secured by the brake spring 18, the planet wheels 14 of the planet gear are rotated in the internal toothing 15 in the ring 16, carrying along the coupling part 20, as they are connected with the end thereof. The coupling part 20 carries along the second coupling part 21, which finally drives the spindle 8. The nut 7 will hereby be screwed outwards on the spindle, whereby the piston rod 4 is extended. It is noted that in this situation the spring 22 around the two coupling parts 20, 21 is pulled together around these and follows the rotational movement.

ii) When the piston rod has reached the outer position or has reached the desired extended position, the power to the motor is cut off. As the spindle 8 is of the non-self-locking type, a load on the piston rod 4 will try to rotate the spindle and thereby the associated coupling part 21 via the nut 7. The coupling part 21 will then expand the surrounding spring 22 out of the ring 16 and try to carry along the second coupling part 20, but this is secured against rotation via the planet wheels and sun wheel because of the great transmission in the worm drive. The spindle is hereby held in its parked position.

iii) To retract the piston rod, the direction of rotation of the motor is reversed and thereby also the transmission so that the direction of rotation of the spindle is reversed, whereby the nut is screwed down on the spindle. The piston rod is hereby retracted. In this situation, the spring 22 will be pulled together around the coupling parts 20, 21 by the coupling part 20, thereby locking these parts.

iv) If the power supply to the motor fails, the piston rod will remain in its current position for the reasons stated in item ii).

If, in this situation, it is desired to place the piston rod in its retracted position for some reason, this may be done by disengaging the brake spring 18 by means of the release device 17. The spring 22 around the two coupling parts 20,

21 will expand against the ring 16 as stated in ii), but since this is free, it will be caused to rotate. The spring 22 is not locked by the second coupling part 20 like in iii), as it is rotated together with the planet wheels 14, which in turn run around the sun wheel 13.

The rate at which the piston rod 4 is retracted depends on how far the adjustment rod 17*a* is moved out, since the cone 17*b* thereon determines the opening degree of the brake spring 18, as this slides with its bent end 18*a* on the cone. The more the cone is moved to the right, of. FIG. 2, the more the brake spring end 18*a* is extended from the pipe 16, corresponding to a greater degree of opening. The maximum rate at which the piston rod can sink back to the starting position is determined by the engagement of the cone 17*b* with the adjustment screw 19.

v) If, for some reason, it is desired to extend the piston rod to its outer position, both in a normal state of operation and in case of power failure, a pull is merely applied to the piston rod 4 or the structional member connected with it. The spindle will hereby cause the coupling part 21 to rotate and expand the spring 22 to engagement with the ring 16. Owing to the winding direction on the brake spring 18, this will open and the ring 16 is released. The planet wheels 14 will merely run on the sun wheel 13, and the second coupling part 20 will be carried along. The piston rod can hereby be extended freely to the desired position.

vi) In case of an unintentional jam during the retraction of the piston rod 4, a pull will be built up in it, thereby retaining the coupling parts 20, 21. As the coupling part 20 cannot be rotated, the planet wheels 14 will apply a torque to the ring 16 in the opening direction of the brake spring, so that the brake spring releases the ring, which then merely revolves. If the direction of rotation of the motor is reversed, the piston rod will be extended without problems.

A linear actuator may be used as either a pull or a push actuator. In both functions, there are situations in which it is desirable to have a "free push/pull" function where the spindle 8 can run freely so that the actuator may be pulled/pushed to the desired position. This function may be disturbed by a linear actuator according to the invention, as the brake spring 18 can prevent this free pull. However, the brake spring 18 may be constructed and arranged in such a manner that the twist of the spring is adapted to the direction of rotation in which the free running of the spindle 8 is desired. In case of a pull actuator, the twist of the spring 18 must thus follow the direction of the threads of the spindle, and if it is a push actuator it must be opposite the threads of the spindle.

Figure 3:
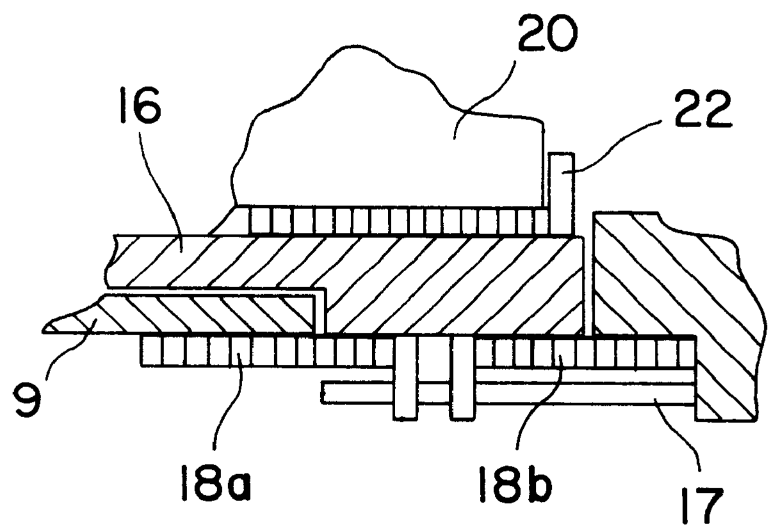
FIG. 3 is a view of a detail of a variant of the embodiment of the invention shown in FIG. 1.

In the event that the actuator must be capable of being used for pull as well as push, the brake spring 18 must be constructed as two springs 18*a*, 18*b* of oppositely directed twist. These two springs 18*a*, 18*b*, as shown in FIG. 3, are both secured to the actuator housing 9 at one end and connected with the release device 17 at the other end. Both springs 18*a*, 18*b* extend inwardly over and meet at the centre of the pipe section 16, where they are connected with the release device 17.

It is evident that the construction described above may also be provided without regulation of the brake means. This construction is also contemplated by the invention. The use of a planet gear without the indicated brake means is also contemplated by the invention.

What is claimed is:

1. A linear actuator which comprises:
   - a housing,
   - a motor,
   - a spindle which is axially rotatable in opposite directions by said motor,
   - a threaded nut mounted on said spindle and movable therealong with rotation of said spindle,
   - a piston rod movable with said threaded nut as said threaded nut moves along said spindle,
   - a transmission in said housing and operatively connected to said motor,
   - a coupling means in said housing operatively connected between said transmission and said spindle, and
   - disengagement means for disengaging said spindle from said motor, said disengagement means including braking means adjustable relative to said housing for causing said coupling means to control rotational speed of said spindle when disengaged from said motor.

2. A linear actuator according to claim 1, wherein the coupling means comprise a coupling unit between the spindle and a transmission shaft based on axially oriented coupling parts which are connected with the spindle and the transmission shaft, respectively, and which are in engagement with each other and surrounded by a helical coupling spring which is radially expandable to disengage the spindle from the motor.

3. A linear actuator according to claim 2, wherein the coupling parts include axially protruding claws for establishing a claw coupling between the coupling parts.

4. A linear actuator according to claim 2, wherein the brake means comprise a pipe section surrounded by a brake spring whose ends are secured to the housing, and including an adjustment device for adjusting the tension of the brake spring around the pipe section.

5. A linear actuator according to claim 4, wherein the pipe section is rotatably arranged in the housing and surrounds the coupling means so that a coupling is established between the coupling means and the pipe section by means of the coupling spring, said coupling spring being expanded radially upon disengagement.

6. A linear actuator according to claim 5, wherein the pipe section is surrounded by said brake spring whose ends are secured to the housing, and wherein said adjustment device adjusts the tension of the brake spring around the pipe section.

7. A linear actuator according to claim 4, wherein the transmission comprises a planet gear comprising a sun wheel driven by the motor, at least one planet wheel connected with the coupling means, and a ring wheel connected with the brake means.

8. A linear actuator according to claim 7, wherein the planet wheel is rotatably mounted on the coupling part rotating on the transmission shaft.

9. A linear actuator according to claim 7, wherein the ring wheel is provided in a portion of an inner side of the pipe section.

* * * * *